(12) United States Patent
Kim et al.

(10) Patent No.: US 8,855,725 B2
(45) Date of Patent: Oct. 7, 2014

(54) APPARATUS AND METHOD FOR REDUCING POWER CONSUMPTION IN MULTI-MODE PORTABLE TERMINAL

(75) Inventors: Hong Kim, Seoul (KR); Eun-Hyun Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 12/891,012

(22) Filed: Sep. 27, 2010

(65) Prior Publication Data

US 2011/0077031 A1      Mar. 31, 2011

(30) Foreign Application Priority Data

Sep. 28, 2009    (KR) .................. 10-2009-0091602

(51) Int. Cl.
*H04W 88/02*  (2009.01)
*H04W 36/00*  (2009.01)
*H04B 17/00*  (2006.01)
*H04B 1/38*   (2006.01)
*H04W 52/02*  (2009.01)

(52) U.S. Cl.
CPC ......... *H04B 1/3816* (2013.01); *H04W 52/0251* (2013.01); *Y20B 60/50* (2013.01)
USPC .......................... 455/574; 455/436; 455/67.11

(58) Field of Classification Search
CPC ..... H04W 66/00; H04W 88/02; H04W 36/00; H04B 17/00
USPC ........................ 455/574, 436, 67.11
See application file for complete search history.

(56) References Cited

U.S. PATENT DOCUMENTS

| | | | |
|---|---|---|---|
| 6,556,820 B1 | 4/2003 | Le et al. | |
| 8,208,944 B2 * | 6/2012 | Kim et al. | 455/456.1 |
| 2007/0263574 A1 | 11/2007 | Lu et al. | |
| 2009/0061932 A1 | 3/2009 | Nagarajan | |
| 2009/0212908 A1 | 8/2009 | Lin et al. | |
| 2009/0239582 A1 | 9/2009 | Lin | |
| 2010/0048248 A1 * | 2/2010 | Park et al. | 455/558 |
| 2010/0255843 A1 * | 10/2010 | Huang et al. | 455/436 |
| 2010/0279698 A1 * | 11/2010 | Wong | 455/450 |
| 2010/0317377 A1 * | 12/2010 | Zou et al. | 455/466 |
| 2012/0077494 A1 * | 3/2012 | Kim et al. | 455/435.1 |
| 2013/0303139 A1 * | 11/2013 | Helfre et al. | 455/417 |
| 2013/0303203 A1 * | 11/2013 | Wang et al. | 455/458 |

FOREIGN PATENT DOCUMENTS

| | | |
|---|---|---|
| CN | 101304579 A | 11/2008 |
| CN | 101480103 A | 7/2009 |
| WO | 99/62282 A1 | 12/1999 |

* cited by examiner

*Primary Examiner* — Bobbak Safaipour
(74) *Attorney, Agent, or Firm* — Jefferson IP Law, LLP

(57) ABSTRACT

An apparatus and method for reducing power consumption in a multi-mode portable terminal are provided. The apparatus includes a Subscriber Identity Module (SIM) management unit and a control unit. The SIM management unit is configured to determine whether there are multiple SIM cards of the same serving cell in a portable terminal supporting a plurality of RF modules and a plurality of SIM cards. The control unit is configured to activate only one RF module corresponding to the SIM cards of the same serving cell when receiving information of the SIM cards of the same serving cell from the SIM management unit.

20 Claims, 4 Drawing Sheets

APPARATUS AND METHOD FOR REDUCING POWER CONSUMPTION IN MULTI-MODE PORTABLE TERMINAL

PRIORITY

This application claims the benefit under 35 U.S.C. §119 of a Korean patent application filed in the Korean Intellectual Property Office on Sep. 28, 2009 and assigned Serial No. 10-2009-0091602, the disclosure of which is incorporated herein by reference.

BACKGROUND OF THE INVENTION

1. Field of the Invention

The present invention relates generally to an apparatus and method for reducing power consumption in a portable terminal. More particularly, the present invention relates to an apparatus and method for solving the problem of power consumption caused by the use of two RF modules in a multi-mode portable terminal supporting two Subscriber Identity Module (SIM) cards.

2. Description of the Related Art

The development of communication technology provides network systems of various communication schemes, and supports various network systems or only one network system according to the region. Also, the network system establishes different fee systems according to service providers. For example, in Russia, there is a great fee difference in network types according to the region. Thus, a conventional scheme equips a portable terminal with two Subscriber Identity Module (SIM) cards to support two types of networks, thereby making it possible to receive a desired network service selectively according to the user's convenience. The portable terminal equipped with two SIM cards is also called a multi-mode portable terminal.

In general, the SIM card is a subscriber identity module card that stores personal information in order to provide various services such as security, payment and identification of a subscriber. Such SIM cards have been developed to freely enjoy mobile communication services by one phone number in every zone, regardless of the mobile communication technology standards such as Code Division Multiple Access (CDMA) and Global System for Mobile communications (GSM). In particular, an SIM of the Universal Mobile Telecommunications System (UMTS) for 3rd Generation (3G) mobile communication is called a Universal Subscriber Identity Module (USIM).

Like a combination of two portable terminals, the conventional multi-mode portable terminal has a Radio Frequency (RF) module corresponding to each SIM card for call reception corresponding to two SIM cards.

Accordingly, the conventional multi-mode portable terminal must operate one of two RF modules in an idle state, thus consuming more power than general portable terminals.

A conventional multi-mode portable terminal operating two RF modules is incapable of information exchange between SIM cards, so that two RF modules are used even when camping on the same cell.

That is, the conventional multi-mode portable terminal operates two RF modules even when using the same cell by two SIM cards, thus consuming more power than general portable terminals.

Therefore, a need exists for an apparatus and method for solving the above problems in the multi-mode portable terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing power consumption in a multi-mode portable terminal by controlling an RF module.

Another aspect of the present invention is to provide an apparatus and method for performing operations corresponding to two Subscriber Identity Module (SIM) cards in a multi-mode portable terminal by using one Radio Frequency (RF) module.

Another aspect of the present invention is to provide an apparatus and method for allowing a multi-mode portable terminal to use only one RF module when using two SIM cards in one cell.

In accordance with an aspect of the present invention, an apparatus for reducing power consumption in a multi-mode portable terminal is provided. The apparatus includes a SIM management unit configured to determine whether there are multiple SIM cards of the same serving cell in a portable terminal supporting a plurality of RF modules and a plurality of SIM cards, and a control unit configured to activate only one of the RF modules corresponding to the SIM cards of the same serving cell when receiving information of the SIM cards of the same serving cell from the SIM management unit.

In accordance with another aspect of the present invention, a method for reducing power consumption in a multi-mode portable terminal is provided. The method includes determining whether there are multiple SIM cards of the same serving cell in a portable terminal supporting a plurality of RF modules and a plurality of SIM cards, and activating only one of the RF modules corresponding to the SIM cards of the same serving cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and method for reducing power consumption in a portable terminal by operating only one of a plurality of Radio Frequency (RF) modules when serving cells of Subscriber Identity Module (SIM) cards supported by the portable terminal are identical. Herein, the exemplary portable terminal is a multi-mode portable terminal that supports a plurality of SIM cards and has an RF module (a communication unit) corresponding to each SIM card for call connection by each SIM card.

Figure 1:
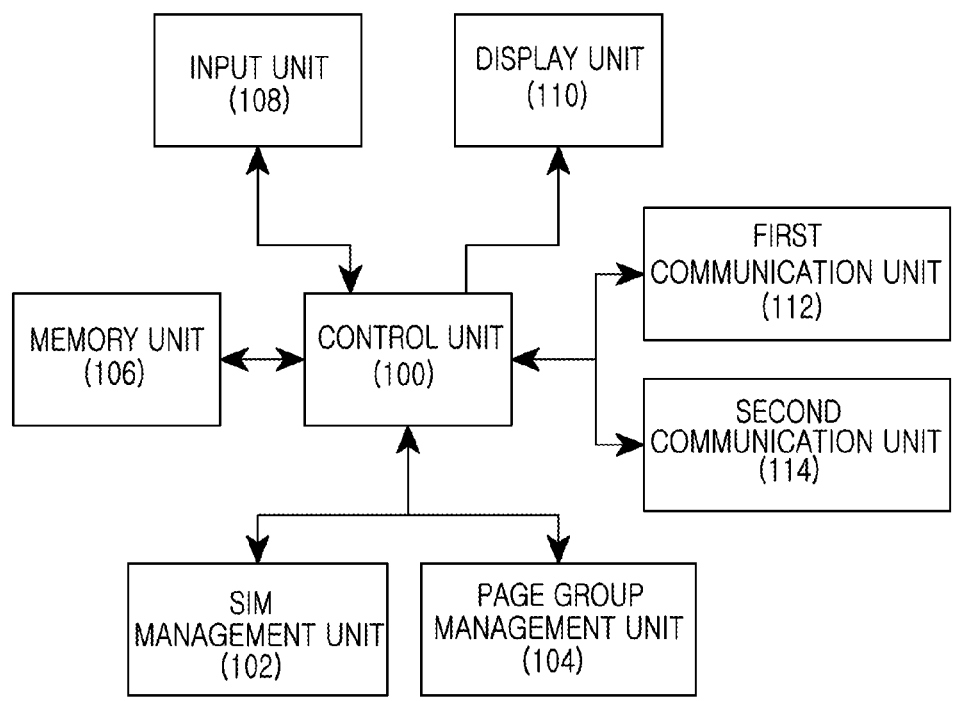
FIG. 1 is a block diagram of a portable terminal reducing power consumption according to an exemplary embodiment of the present invention.

FIG. 1 is a block diagram of a portable terminal reducing power consumption according to an exemplary embodiment of the present invention.

Referring to FIG. 1, the portable terminal may include a control unit 100, a SIM management unit 102, a paging group management unit 104, a memory unit 106, an input unit 108, a display unit 110, a first communication unit 112, and a second communication unit 114. The first communication unit 112 and the second communication unit 114 may be referred to as RF modules (a first RF module and a second RF module). The portable terminal may include additional units. Similarly, the functionality of two or more of the above units may be integrated into a single component.

The control unit 100 controls an overall operation of the portable terminal. For example, the control unit 100 controls processes of voice communication and data communication. In addition to the general operations, the control unit 100 controls an RF module corresponding to a SIM card supported by the portable terminal, to reduce the power consumption of the portable terminal.

That is, if the serving cell of the first SIM card and the serving cell of the second SIM card are identical, then the control unit 100 controls operations of two SIM cards to be performed by only one RF module, in order to reduce power consumption caused by two RF modules in redundant operation.

Herein, the case where the serving cells of the two SIM cards are identical includes the case where the service providers of the two SIM cards are identical and use the same cell, the case where the service providers of the two SIM cards are roamable and become identical by Public Land Mobile Network (PLMN) selection, and the case of a multiple PLMN-ID environment where one cell is shared by multiple service providers (the first SIM card and the second SIM card have different service providers but use the same cell).

Also, if one RF module is used to receive a paging message, then the control unit 100 detects a SIM card corresponding to the received paging message and enables call connection using the SIM card.

The SIM management unit 102 includes a SIM slot (not illustrated) that enables the installation of a first SIM card and a second SIM card that store various user information and supporting network information. The SIM management unit 102 detects network information, used by the first SIM card and the second SIM card, to determine whether the serving cells of the two SIM cards are identical.

When the portable terminal maintains an idle state, the paging group management unit 104 detects a paging group corresponding to the first SIM card and a paging group corresponding to the second SIM card and determines whether the paging groups of the SIM cards are identical.

That is, the paging group management unit 104 determines whether the paging groups of the SIM cards are identical. If the paging groups of the SIM cards are identical, then the control unit 100 performs a control operation to receive the paging messages of two SIM cards by one paging information.

If the paging groups of the SIM cards are not identical, then the control unit 100 performs a control operation to receive the paging message by the paging information corresponding to each SIM card.

The memory unit 106 includes memory such as Read Only Memory (ROM), Random Access Memory (RAM), a flash ROM, and the like. The ROM stores various reference data and microcodes of programs for controls and processes of the control unit 100, the SIM management unit 102, and the paging group management unit 104.

The RAM is a working memory of the control unit 100. The RAM stores temporary data generated during the execution of various programs. The flash ROM stores various updatable data such as a phone directory, an outgoing message, and an incoming message.

The input unit 108 includes numeric keys of digits 0-9 and a plurality of function keys, such as a menu key, a cancel (delete) key, a confirmation key, a talk key, an end key, an Internet connection key, navigation keys, and the like. The input unit 108 provides key input data corresponding to keys pressed by a user to the control unit 100. These keys are merely examples of keys which may make up the input unit 108. That is, the input unit may include additional or different keys, or different input mechanisms, through which the user supplies input to the portable terminal.

The display unit 110 displays status information, text such as numerals and characters, moving pictures, and still pictures, that are generated during the operation of the portable terminal. The display unit 116 may include a color Liquid Crystal Display (LCD), an Active Mode Organic Light Emitting Diode (AMOLED), and the like.

The first communication unit 112 performs a communication operation corresponding to the first SIM card, and the second communication unit 114 performs a communication operation corresponding to the second SIM card. The first communication unit 112 and the second communication unit 114 perform an operation of transmitting/receiving wireless signals of data input/output through an antenna (not illustrated). For example, in a Transmission (TX) mode, the communication unit channel-codes, spreads, and RF-processes TX data prior to transmission. In Reception (RX) mode, the communication unit downconverts a received RF signal to a baseband signal and despreads and channel-decodes the baseband signal to restore the original data.

It is illustrated that the SIM management unit 102 and the paging group management unit 104 are additionally provided to perform their respective operations. However, this is merely exemplary and is not intended to limit the scope of the present invention. Those skilled in the art will readily understand that various changes in configurations may be made therein without departing from the scope of the present invention. For example, the operation of the SIM management unit 102 and the operation of the paging group management unit 104 may be performed by the control unit.

A description has been given of an apparatus for reducing power consumption in a portable terminal by operating only one RF module when serving cells of two SIM cards supported by the portable terminal are identical, according to an exemplary embodiment of the present invention. Hereinafter, a description will be given of a method for reducing power consumption in a portable terminal by operating only one RF module when serving cells of two SIM cards supported by the portable terminal are identical, according to an exemplary embodiment of the present invention.

Figure 2:
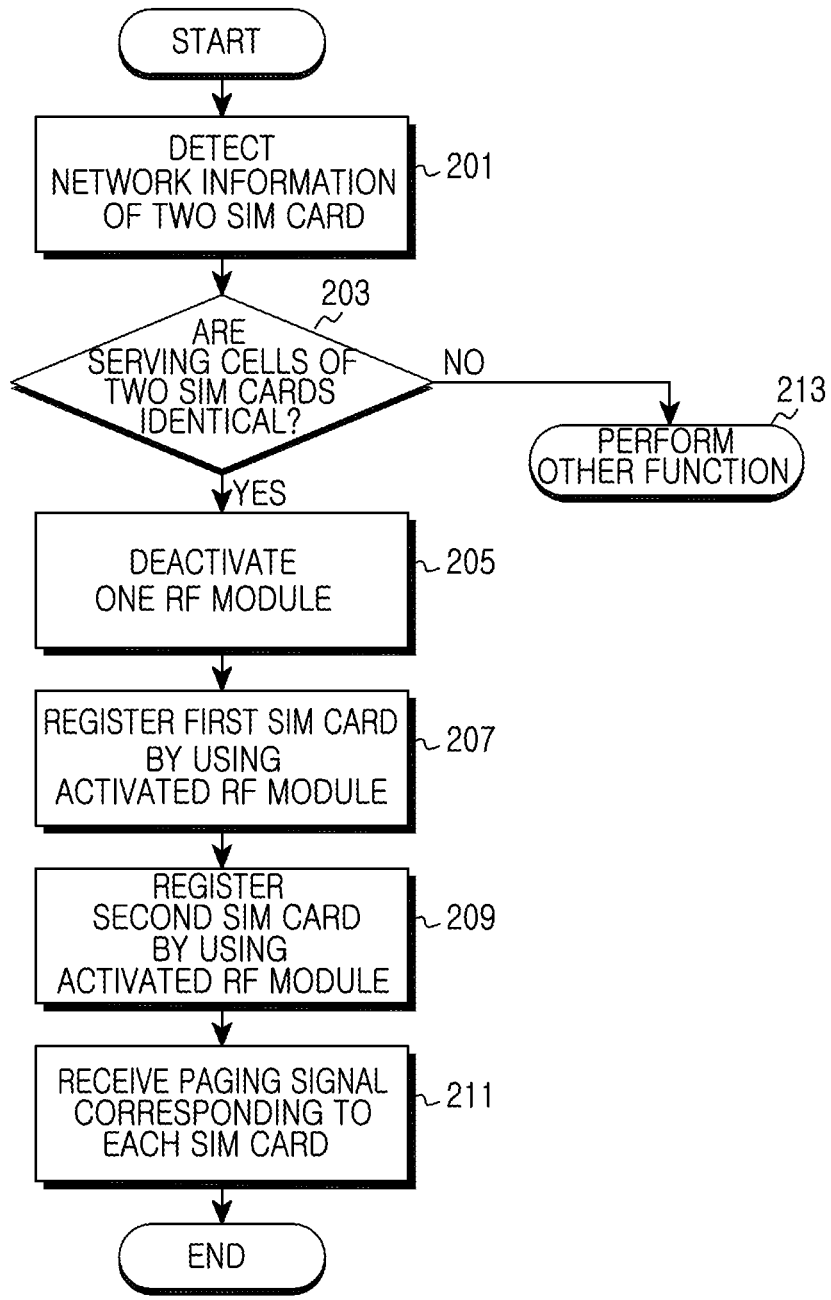
FIG. 2 is a flowchart illustrating a process for reducing power consumption in a portable terminal according to an exemplary embodiment of the present invention.

FIG. 2 is a flowchart illustrating a process for reducing power consumption in a portable terminal according to an exemplary embodiment of the present invention.

Like the conventional portable terminal, the portable terminal of this exemplary embodiment supports two SIM cards and has an RF module (a communication unit) corresponding to each SIM card for call connection by each SIM card. Unlike the conventional portable terminal, the portable terminal of this exemplary embodiment is configured to solve the problem of power consumption caused when operating two RF modules.

Referring to FIG. 2, the portable terminal of this exemplary embodiment detects network information of the two SIM cards in step 201. Herein, the network information is information about networks used by each SIM card.

The portable terminal determines whether the two SIM cards are of a same serving cell in step 203.

Herein, the case where the two SIM cards are of a same serving cell includes a case where the service providers of the two SIM cards are identical and use the same cell, a case where the service providers of the two SIM cards are roamable and become identical by Public Land Mobile Network (PLMN) selection, and a case of a multiple PLMN-ID environment where one cell is shared by multiple service providers (in the latter case, the first SIM card and the second SIM card have different service providers but use the same cell).

If it is determined in step 203 that the serving cells of the two SIM cards are not identical, then the portable terminal performs another function (e.g., a function of operating two RF modules as in the conventional method) in step 213.

If it is determined in step 203 that the serving cells of the two SIM cards are identical, then the portable terminal deactivates one of the two RF modules in step 205.

Herein, since the portable terminal then uses two SIM cards through one RF module in the same serving cell, it either activates only the RF module corresponding to the SIM card selected as a master, or activates only the RF module selected by the user.

Thereafter, the portable terminal performs a registration operation on the two SIM cards by using the activated RF module.

The portable terminal registers the first SIM card in the corresponding cell by using the activated RF module in step 207, and registers the second SIM card in the corresponding cell in step 209.

The portable terminal receives a paging signal corresponding to each SIM card in step 211.

Herein, the portable terminal may use one RF module to receive a paging signal corresponding to each SIM card, while using one RF module to register two SIM cards.

Accordingly, the portable terminal may perform call connection by using the SIM card corresponding to the received paging signal.

Thereafter, the portable terminal ends the process according to the present invention.

Figure 3:
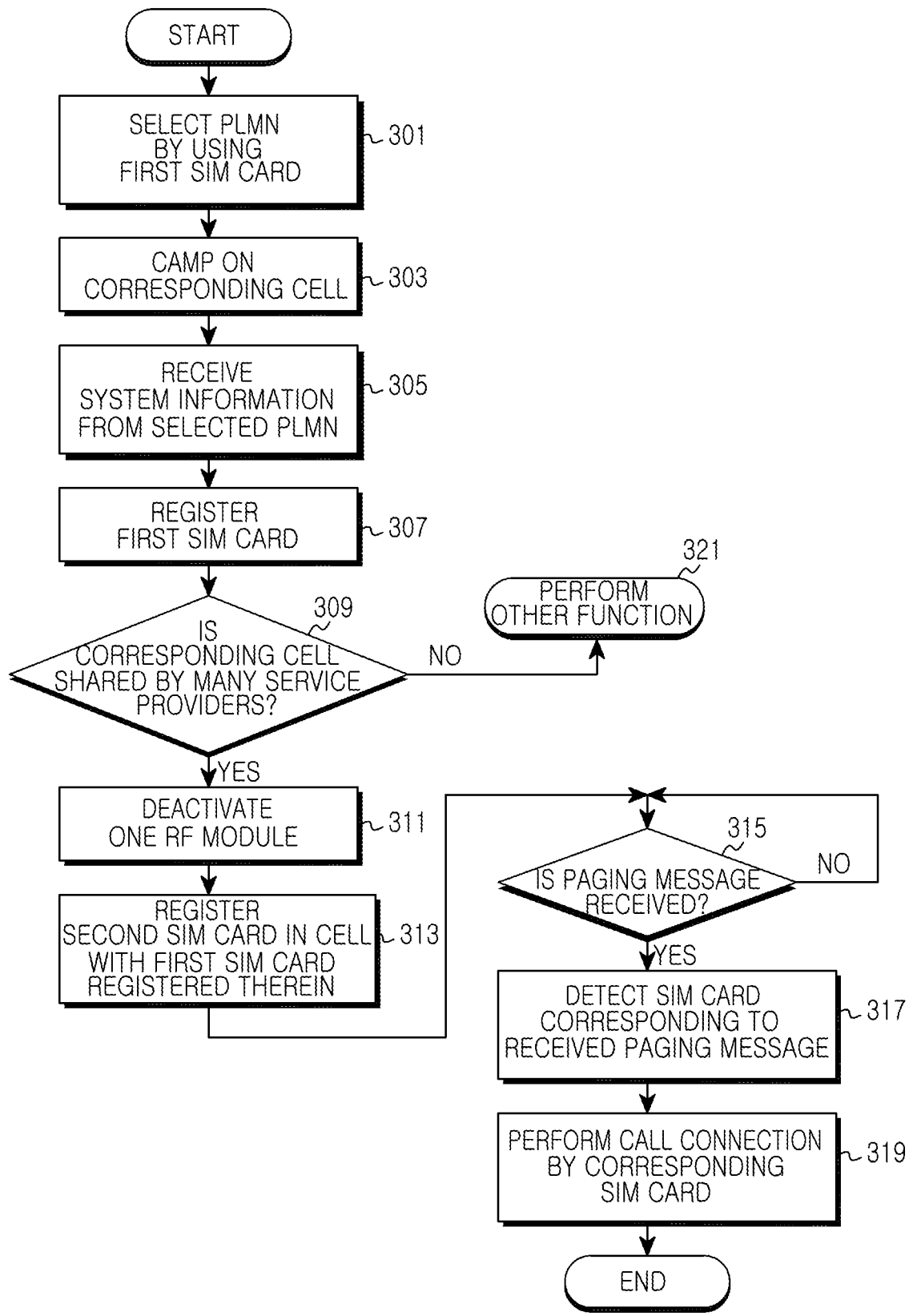
FIG. 3 is a flowchart illustrating a process for reducing power consumption in a portable terminal according to an exemplary embodiment of the present invention.

FIG. 3 is a flowchart illustrating a process for reducing power consumption in a portable terminal according to an exemplary embodiment of the present invention.

As described above, the portable terminal of this exemplary embodiment also supports two SIM cards and has an RF module (a communication unit) corresponding to each SIM card for call connection by each SIM card.

Referring to FIG. 3, the portable terminal uses the first SIM card to select a PLMN, that is, a desired serving network of the portable terminal itself in step 301, and camps on the corresponding cell to receive system information from the PLMN in step 303.

The portable terminal that camped on the corresponding cell (in step 303) receives the system information from the PLMN in step 305, and registers the first SIM card in the corresponding cell in step 307.

The portable terminal determines whether it is in an environment where the corresponding cell is shared by multiple service providers in step 309.

Herein, the environment where the corresponding cell is shared by multiple service providers is an example of the environment where the serving cells of the two SIM cards are identical, when means a multiple PLMN-ID environment where one cell is shared by multiple service providers (that is, a case where the first SIM card and the second SIM card have different service providers but use the same cell).

If it is determined in step 309 that the portable terminal is not in an environment where the corresponding cell is shared by multiple service providers, then the portable terminal performs another function (e.g., a function of operating two RF modules as in the conventional method) in step 321.

On the other hand, if it is determined in step 309 that the portable terminal is in an environment where the corresponding cell is shared by multiple service providers, then the portable terminal deactivates one of the two RF modules in step 311.

The portable terminal registers the second SIM card in the cell with the first SIM card registered therein in step 313. Herein, since only one RF module is activated, the portable terminal registers the two SIM cards by using only one RF module.

The portable terminal determines whether a paging message is received in step 315. Herein, the paging message is received by one RF module, which includes a paging message corresponding to the first SIM card and a paging message corresponding to the second SIM card.

The portable terminal determines which SIM card corresponds to the received paging message in step 317.

The portable terminal performs call connection by the corresponding SIM card in step 319.

Thereafter, the portable terminal ends the process according to the present invention.

Figure 4:
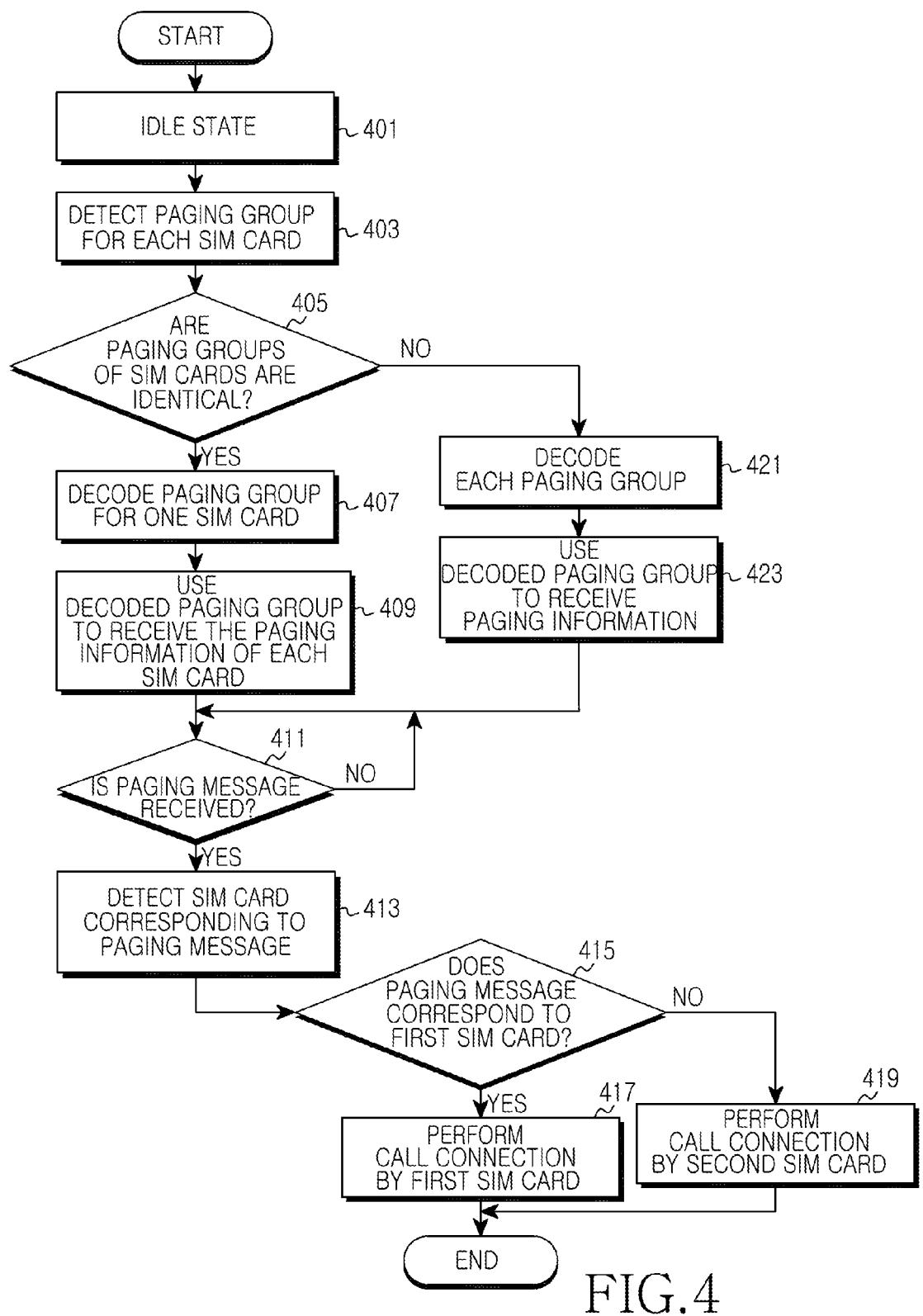
FIG. 4 is a flowchart illustrating a process for performing call connection according to paging reception in a portable terminal according to an exemplary embodiment of the present invention.

FIG. 4 is a flowchart illustrating a process for performing call connection according to paging reception in a portable terminal, according to an exemplary embodiment of the present invention.

Referring to FIG. 4, the portable terminal maintains an idle state in step 401, and detects a paging group (a first paging group) corresponding to the first SIM card and a paging group (a second paging group) corresponding to the second SIM card in step 403.

That is, the portable terminal detects a paging group (a first paging group) defined to enable paging and resource release corresponding to the first SIM card, and a paging group (a second paging group) defined to enable paging and resource release corresponding to the second SIM card.

Thereafter, the portable terminal compares the paging groups of the SIM cards detected in step 403, and determines whether the paging groups of the SIM cards are identical in step 405.

If it is determined that the paging groups of the SIM cards (i.e., the first paging group and the second paging group) are not identical in step 405, then the portable terminal decodes each of the paging groups (the first paging group and the second paging group) in step 421. The portable terminal uses the decoded paging group to receive paging information in step 423.

On the other hand, if it is determined that the paging groups of the SIM cards (i.e., the first paging group and the second paging group) are identical in step 405, then the portable terminal decodes one of the paging groups in step 407. The portable terminal uses the decoded paging group to receive the paging information of the first SIM card and the paging information of the second SIM card in step 409.

That is, if the service providers of the two SIM cards are identical and use the same cell, then the portable terminal performs an operation on each SIM card by using an RF module corresponding to one SIM card and the paging group received through the RF module.

Thereafter, the portable terminal determines whether a paging message is received in step 411.

If it is determined in step 411 that a paging message is not received, the portable terminal repeats the operation of step 411.

On the other hand, if it is determined in step 411 that a paging message is received, the portable terminal detects the SIM card corresponding to the received paging message in step 413.

The portable terminal detects the SIM card corresponding to the received paging message because it uses one RF module to receive the paging message corresponding to the two SIM cards.

Thereafter, the portable terminal determines whether the received paging message corresponds to the first SIM card in step 415.

If the received paging message corresponds to the first SIM card in step 415, then the portable terminal performs call connection by the first SIM card corresponding to the received paging message in step 417.

On the other hand, if the received paging message corresponds to the second SIM card in step 415, then the portable terminal performs call connection by the second SIM card corresponding to the received paging message in step 419.

Thereafter, the portable terminal ends the process according to the present invention.

As described above, when the serving cells of the SIM cards supported by the portable terminal are identical, the present invention operates only one RF module of the portable terminal, thereby making it possible to solve the problem of power consumption caused when the portable terminal simultaneously uses two RF modules unnecessarily.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for reducing power consumption in a multi-mode portable terminal supporting a plurality of Radio Frequency (RF) modules and a plurality of Subscriber Identity Module (SIM) cards, the apparatus comprising:
a SIM management unit which determines that the portable terminal comprises multiple SIM cards of a same serving cell and provides information thereof to a control unit; and
the control unit which activates only one of the RF modules corresponding to the SIM cards of the same serving cell when the control unit receives the information of the SIM cards of the same serving cell from the SIM management unit,
wherein a case where the SIM cards are of the same serving cell includes one of a case where service providers of the SIM cards are identical and use the same serving cell, a case where the service providers of the SIM cards are roamable and become identical by Public Land Mobile Network (PLMN) selection, and a case of a multiple PLMN-ID environment where one cell is shared by multiple service providers.

2. The apparatus of claim 1, wherein, after the activating of the only one of the RF modules corresponding to the SIM cards of the same serving cell, the control unit controls the activated RF module to receive a paging message of the SIM cards of the same serving cell.

3. The apparatus of claim 1, wherein the control unit registers the SIM cards of the same serving cell by the activated RF module.

4. The apparatus of claim 3, wherein the activated RF module receives a paging message corresponding to a SIM card of the same serving cell.

5. The apparatus of claim 1, wherein when receiving a paging message, the control unit detects a SIM card of the same serving cell corresponding to the received paging message and performs call connection by the detected SIM card.

6. The apparatus of claim 2, wherein after detecting a paging group of the SIM cards of the same serving cell, the control unit receives the paging message corresponding to the detected paging group.

7. The apparatus of claim 6, wherein if paging groups of the SIM cards of the same serving cell are identical, the control unit decodes the paging group of one SIM card and receives the paging message by using paging information of each of the SIM cards.

8. The apparatus of claim 6, wherein if paging groups of the SIM cards of the same serving cell are not identical, the control unit decodes the paging group of each SIM card and receives the paging message by using paging information of each of the SIM cards.

9. The apparatus of claim 1, wherein the control unit deactivates an RF module corresponding to a SIM card of the same serving cell when receiving information of the SIM cards of the same serving cell from the SIM management unit.

10. The apparatus of claim 1, wherein the activated RF module comprises one of an RF module corresponding to a SIM card selected as a master and an RF module selected by a user.

11. A method for reducing power consumption in a multi-mode portable terminal supporting a plurality of Radio Frequency (RF) modules and a plurality of Subscriber Identity Module (SIM) cards, the method comprising:
    determining that the portable terminal comprises multiple SIM cards of a same serving cell; and
    when it is determined that the portable terminal comprises the SIM cards of the same serving cell, activating only one of the RF modules corresponding to the SIM cards of the same serving cell,
    wherein a case where the SIM cards are of the same serving cell includes one of a case where service providers of the SIM cards are identical and use the same serving cell, a case where the service providers of the SIM cards are roamable and become identical by Public Land Mobile Network (PLMN) selection, and a case of a multiple PLMN-ID environment where one cell is shared by multiple service providers.

12. The method of claim 11, further comprising:
    receiving a paging message of the SIM cards of the same serving cell by activating the only one of the RF modules corresponding to the SIM cards of the same serving cell.

13. The method of claim 11, further comprising:
    registering the SIM cards of the same serving cell by the activated RF module.

14. The method of claim 13, further comprising receiving a paging message corresponding to a SIM card of the same serving cell.

15. The method of claim 11, further comprising:
    detecting a SIM card of the same serving cell corresponding to a received paging message after receiving the paging message; and
    performing call connection by the detected SIM card.

16. The method of claim 12, wherein the receiving of the paging message of the SIM cards of the same serving cell comprises:
    detecting a paging group of SIM cards of the same serving cell; and
    receiving the paging message corresponding to the detected paging group.

17. The method of claim 16, wherein the receiving of the paging message of the SIM cards of the same serving cell comprises:
    detecting paging groups of the SIM cards of the same serving cell; and
    decoding, if the paging groups of the SIM cards of the same serving cell are identical, the paging group of one SIM card and receiving the paging message by using paging information of each of the SIM cards.

18. The method of claim 16, wherein the receiving of the paging message of the SIM cards of the same serving cell comprises:
    decoding, if paging groups of the SIM cards of the same serving cell are not identical, the paging group of each SIM card and receiving the paging message by using paging information of each of the SIM cards.

19. The method of claim 11, further comprising deactivating an RF module corresponding to a SIM card of the same serving cell.

20. The method of claim 11, wherein the activated RF module comprises one of an RF module corresponding to a SIM card selected as a master and an RF module selected by a user.

* * * * *